Patented May 21, 1946

2,400,500

UNITED STATES PATENT OFFICE 2,400,500

DIHYDROQUINOLINE CONDENSATION PRODUCT

Carlin F. Gibbs, Cuyahoga Falls, Ohio, assignor to The B. F. Goodrich Company, New York, N. Y., a corporation of New York No Drawing. Application February 4, 1944, Serial No. 521,143

5 Claims. (Cl. 260—288)

This invention relates to new chemical compositions and pertains more specifically to the condensation products of 1,2-dihydroquinolines with diarylamines.

These new chemical compositions are useful as intermediates in the preparation of other organic compounds and also as antioxidants for the preservation of organic substances which tend to deteriorate in the presence of oxygen, such as fish oils, linseed oil, tung oil, gasolines containing unsaturates, rubber, and the like. They are effective with any kind of rubber such as caoutchouc, balata, gutta percha, latex, reclaimed rubber, artificial rubber isomers, and such synthetic rubbers as polychloroprene, copolymers of butadiene with acrylonitrile, styrene, methyl acrylate, methyl methacrylate, isobutylene, and other copolymerizable monomers. When used in rubber, my new compositions are effective in amounts ranging from 0.1 to 5% or more of the rubber composition, and are particularly useful in preventing flex-cracking of the rubbers.

Among the 1,2-dihydroquinolines, which may be used to prepare my new compositions are 2,2,4-trimethyl 1,2-dihydroquinoline, 2-methyl-2,4-diethyl 1,2 dihydroquinoline, 1,2,2,4-tetramethyl 1,2-dihydroquinoline, 2,2,4,6-tetramethyl, 1,2-dihydroquinoline, 2,2,4,7-tetramethyl 1,2-dihydroquinoline, 1,2,2,4,7-pentamethyl 1,2-dihydroquinoline, 6,6'-bis(2,2,4-trimethyl-1,2-dihydroquinoline), and the like. Other substituent groups, such as chloro, bromo, alkoxy, aryl, nitro, etc., may also be present in the 1,2-dihydroquinoline, as for example 7-chloro 2,2,4-trimethyl 1,2-dihydroquinoline, 2,2,4-trimethyl-6-phenyl-1,2-dihydroquinoline, and the like. The reaction products of acetone with aminoindans, which are 1,2-dihydroquinolines and which may be prepared as described in my copending application Serial No. 517,901, filed January 11, 1944, may also be used. These compounds may be prepared, as is well-known, by reacting an aliphatic ketone or aldehyde with a primary aromatic amine. Such a process is described by Craig, U. S. Patent 2,095,126, issued October 5, 1937.

The diarylamines which may be used to prepare my new compositions include, among others, diphenylamine, phenyl-alpha-naphthylamine, phenyl-beta-naphthylamine, the ditolylamines, the phenyltolylamines, the dinaphthylamines, phenyl-p-xenylamine, di-p-xenylamine, anilino tetraphenylmethane, dianilinodiphenylmethane, p-hydroxydiphenylamine, p-amino-diphenylamine, N,N'-diphenyl-p-phenylenediamine, anilino-biphenylene oxide, anilino acridine, 6-anilino-quinoline, p-cholorodiphenylamine, p-isopropoxydiphenylamine, phenylindanylamine, indanyl-alpha-naphthylamine, diindanylamine, and the like.

The secondary amine reaction products of diarylamines with alcohols, aldehydes, and ketones are also the chemical equivalent of the diarylamines themselves for this reaction. The diarylamines containing only carbon, hydrogen and nitrogen are preferred, however.

The reaction is carried out in the presence of an acidic condensation catalyst, for example, a catalyst of the Friedel-Crafts type. Among suitable catalysts are hydrogen chloride, phosphoric acid, sulphuric acid, sodium bisulphate, zinc chloride, aluminum chloride, boron trifluoride, hydrofluoric acid, stannic chloride, ammonium bromide, iodine, and the like. In general, any of the well-known acidic condensation catalysts may be employed, that is, compounds which are strong acids, or which produce acids upon hydrolysis or upon contact with organic materials. Although the precise chemical structure of my new compositions is not known, it is believed that the diarylamines add to the double bond of the dihydroquinoline to form a substituted tetrahydroquinoline.

The reaction can usually be carried out at a temperature of 50° to 300° C. and at either atmospheric or elevated pressure, depending upon the reagents used. The relative proportion of the reagents employed is not critical, although I have found it desirable to employ an excess of the diarylamine, which serves as a solvent or medium for the reaction. Although I have found 0.1 mole of catalyst to be most effective with one mole of diarylamine, other amounts, from 0.01 to 1.0 mole may be found desirable under special conditions.

The following specific example is described in order more fully to illustrate the nature of my invention.

About 338 parts by weight of diphenylamine and 26.6 parts of aluminum chloride were heated to about 125° C. Approximately 173 parts of 2,2,4-trimethyl 1,2-dihydroquinoline were added slowly and with stirring to the mixture while maintaining it at a temperature of about 125° C. After the dihydroquinoline had been completely added, the mixture was heated for a few minutes more, then cooled to room temperature, and washed with a 10% aqueous sodium hydroxide solution. It was then washed with a dilute sodium chloride solution, dried, and distilled at a pressure of one millimeter in order to separate the excess diphenylamine, which boils at about 100–110° C., from the desired product, which boils at 227° to 240° C. at that pressure. The desired reaction product was recrystallized from a mixture of hexane and benzene, appearing in the form of a white crystalline solid melting at 131° to 132° C.

Similar results may be obtained when other similar 1,2-dihydroquinolines and diarylamines are reacted as described above; for example, when 2,2,4-trimethyl 1,2-dihydroquinoline is reacted with phenyl-beta-naphthylamine, a product quite similar to the above described product is obtained.

As an indication of the antioxidant properties of the reaction product of 2,2,4-trimethyl 1,2-dihydroquinoline and diphenylamine it was incorporated in the following rubber composition, in which the parts are by weight:

| | |
|---|---|
| Rubber | 100.0 |
| Zinc oxide | 5.0 |
| Sulfur | 3.0 |
| Carbon black | 50.0 |
| Stearic acid | 3.5 |
| Pine tar | 3.0 |
| Mercaptobenzothiazole | 1.0 |
| Antioxidant | 2.0 |

The composition containing the antioxidant and one containing no antioxidant were vulcanized by heating 60 minutes at 279° F. The ultimate tensile strength and ultimate elongation of the samples were then determined and the samples were aged for 96 hours in oxygen at 70° C. at 300 lbs. per sq. in. pressure, and the percent loss in ultimate tensile strength and ultimate elongation was determined. The results are given in the following table:

| Antioxidant | Percent loss | |
|---|---|---|
| | Tensile strength | Elongation |
| None | 79 | 55 |
| Product of specific example | 30 | 19 |

Samples of these compositions were also vulcanized by heating 75 minutes at 279° F., and after aging 14 days in a Geer oven at 70° C., were tested on a DeMattia flexing machine at room temperature. The samples were rated on a scale of 0 (no cracks) to 10 (complete rupture). The sample containing no antioxidant had a rating of 9 at 300,000 flexures, whereas the sample containing my new composition had a rating of only 7 at 1,700,000 flexures.

These results demonstrate the effectiveness of my new composition as antioxidants. Similar results may be obtained with the products made by condensing other 1,2-dihydroquinolines with diarylamines in the manner described above.

Although I have herein disclosed specific embodiments of my invention, I do not intend to limit myself solely thereto, but to include all of the obvious variations and modifications within the spirit and scope of the appended claims.

I claim:

1. The product obtained by condensing a 1,2-dihydroquinoline with a diarylamine in the presence of an acidic condensation catalyst selected from the group consisting of strong acids and hydrolyzable compounds of strong acids at a temperature from about 50° to about 300° C.

2. The product obtained by condensing a 1,2-dihydroquinoline with a diarylamine containing only carbon, hydrogen and nitrogen in the presence of an acidic condensation catalyst selected from the group consisting of strong acids and hydrolyzable compounds of strong acids at a temperature from about 50° to about 300° C.

3. The product obtained by condensing a 1,2-dihydroquinoline with diphenylamine in the presence of an acidic condensation catalyst selected from the group consisting of strong acids and hydrolyzable compounds of strong acids at a temperature from about 50° to about 300° C.

4. The product obtained by condensing a 1,2-dihydroquinoline with phenyl-beta-naphthylamine in the presence of an acidic condensation catalyst selected from the group consisting of strong acids and hydrolyzable compounds of strong acids at a temperature from about 50° to about 300° C.

5. The product obtained by condensing 2,2,4-trimethyl 1,2-dihydroquinoline with diphenylamine in the presence of an acidic condensation catalyst selected from the group consisting of strong acids and hydrolyzable compounds of strong acids at a temperature from about 50° to about 300° C.

CARLIN F. GIBBS.